(12) United States Patent
Yuan et al.

(10) Patent No.: US 11,223,205 B2
(45) Date of Patent: Jan. 11, 2022

(54) METHOD FOR SYNCHRONIZING PWM CONTROL SIGNALS OF INVERTERS, INVERTER, AND POWER GRID SYSTEM

(71) Applicant: HUAWEI TECHNOLOGIES CO., LTD., Guangdong (CN)

(72) Inventors: Hongwen Yuan, Hefei (CN); Fuqiang Xu, Shanghai (CN); Fangcheng Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 16/833,969

(22) Filed: Mar. 30, 2020

(65) Prior Publication Data
US 2020/0227919 A1 Jul. 16, 2020

Related U.S. Application Data

(63) Continuation of application No. PCT/CN2017/104067, filed on Sep. 28, 2017.

(51) Int. Cl.
*H02M 7/493* (2007.01)
*H02M 1/08* (2006.01)
(Continued)

(52) U.S. Cl.
CPC .............. *H02J 3/38* (2013.01); *H02M 1/083* (2013.01); *H02M 7/48* (2013.01)

(58) Field of Classification Search
CPC ...... H02M 1/0025; H02M 7/48; H02M 7/493; H02M 1/083; H02M 7/5395; H02J 3/38; H02J 3/40
See application file for complete search history.

(56) References Cited

U.S. PATENT DOCUMENTS 5,929,538 A * 7/1999 O'Sullivan ........... H02J 7/1415
307/66
2005/0007042 A1 * 1/2005 Moore ................... A01B 45/02
318/139
(Continued)

FOREIGN PATENT DOCUMENTS

CN        102346219 A        2/2012
CN        104486059 A        4/2015
(Continued)

*Primary Examiner* — Jared Fureman
*Assistant Examiner* — Esayas G Yeshaw
(74) *Attorney, Agent, or Firm* — Leydig, Voit & Mayer, Ltd.

(57) ABSTRACT

A method for synchronizing PWM control signals of inverters, an inverter, and a power grid system are disclosed, so that PWM control signals of inverters connected to a power grid can be synchronized. A direct current voltage terminal of the inverter is connected to an external power supply, and an alternating current voltage terminal of the inverter is connected to an alternating current point of common coupling of a power grid, and the method includes: obtaining a phase of an alternating current voltage of the power grid (S101); determining a time period during which the phase of the alternating current voltage varies within a preset phase threshold interval; calculating a period of a preset carrier wave based on a preset carrier wave ratio and the time period (S103); and generating a PWM control signal of the inverter based on a PWM modulation signal and a preset carrier wave (S105).

20 Claims, 9 Drawing Sheets

(51) Int. Cl.
*H02J 3/38* (2006.01)
*H02M 7/48* (2007.01)

(56) References Cited

U.S. PATENT DOCUMENTS

| | | | | |
|---|---|---|---|---|
| 2012/0080942 | A1* | 4/2012 | Carralero | H02J 3/383 |
| | | | | 307/24 |
| 2013/0077367 | A1* | 3/2013 | Zhu | H02J 3/381 |
| | | | | 363/97 |
| 2015/0043263 | A1* | 2/2015 | Diber | H02M 1/40 |
| | | | | 363/140 |
| 2015/0160676 | A1* | 6/2015 | Pan | H02J 3/381 |
| | | | | 307/82 |
| 2015/0357822 | A1 | 12/2015 | Yokokawa et al. | |
| 2016/0142744 | A1* | 5/2016 | Hirota | H04N 21/4821 |
| | | | | 725/54 |
| 2017/0229937 | A1* | 8/2017 | Pedersen | H01F 27/28 |
| 2017/0294852 | A1* | 10/2017 | Correa Vasques | H02M 1/08 |
| 2018/0287391 | A1* | 10/2018 | Shibata | H02J 3/40 |
| 2019/0267836 | A1* | 8/2019 | Paatero | H02J 9/062 |

FOREIGN PATENT DOCUMENTS

| | | |
|---|---|---|
| CN | 104682429 A | 6/2015 |
| CN | 104868769 A | 8/2015 |
| CN | 104883085 A | 9/2015 |
| CN | 104901333 A | 9/2015 |
| CN | 104953878 A | 9/2015 |
| CN | 105978554 A | 9/2016 |
| CN | 106374530 A | 2/2017 |
| CN | 106685250 A | 5/2017 |
| CN | 106849721 A | 6/2017 |
| CN | 106981883 A | 7/2017 |
| EP | 1251632 A2 | 10/2002 |

\* cited by examiner

METHOD FOR SYNCHRONIZING PWM CONTROL SIGNALS OF INVERTERS, INVERTER, AND POWER GRID SYSTEM

CROSS-REFERENCE TO RELATED APPLICATIONS

This application is a continuation of International Application No. PCT/CN2017/104067, filed on Sep. 28, 2017, the disclosure of which is hereby incorporated by reference in its entirety.

TECHNICAL FIELD

This application relates to the field of electric power technologies, and in particular, to a method for synchronizing PWM control signals of inverters, an inverter, and a power grid system.

BACKGROUND

An inverter is a power conversion apparatus that converts a direct current into an alternating current, and is widely applied in the modern electric power industry. In some industrial scenarios such as a photovoltaic field, as an installed capacity increases, it is increasingly popular that a plurality of inverters are connected in parallel. When a plurality of photovoltaic inverters are connected in parallel for operation, because these inverters have different DSP (digital signal processor) crystal oscillators, phases of PWM (pulse width modulation, pulse width modulation) carrier waves are out of synchronization. As a result, PWM control signals of the inverters are out of synchronization, and consequently, high-frequency ripple circulations are generated between the inverters. The high-frequency circulations are superimposed over fundamental currents that are output from the inverters, causing severe distortions. The current distortions not only increase losses to the inverters and reduce system efficiency, but also threat safety of internal components of the inverters.

SUMMARY

Embodiments of this application provide a method for synchronizing PWM control signals of inverters, an inverter, and a power grid system, so that PWM control signals of inverters connected to a power grid can be synchronized.

To achieve the foregoing objective, the following technical solutions are used in the embodiments of this application.

According to a first aspect, a method for synchronizing PWM control signals of inverters is provided, where a direct current voltage terminal of an inverter circuit of the inverter is connected to an external power supply, and an alternating current voltage terminal of the inverter circuit of the inverter is connected to an alternating current point of common coupling of a power grid, and the method includes: obtaining a phase $\theta$ of an alternating current voltage of the power grid; determining a time period $T_\theta$ during which the phase of the alternating current voltage varies within a preset phase threshold interval, when it is detected that the phase $\theta$ of the alternating current voltage has reached a phase threshold, where the phase threshold is a start phase of the preset phase threshold interval; calculating a period $T_c$ of a preset carrier wave based on a preset carrier wave ratio $N_T$ and the time period $T_\theta$; generating the preset carrier wave $C_0(t)$ based on the period $T_c$ of the preset carrier wave; and generating a PWM control signal of the inverter based on a PWM modulation signal and the preset carrier wave $C_0(t)$, so that the inverter circuit of the inverter converts a direct current voltage of the external direct current power supply into the alternating current voltage of the power grid based on the PWM control signal. In the foregoing solution, the phase $\theta$ the alternating current voltage of the power grid is taken for reference in a process of generating a PWM control signal of each inverter connected to the power grid. Therefore, it can be avoided that the PWM control signals of the inverters are out of synchronization because the inverters have different DSP crystal oscillators, to ensure synchronization of the PWM control signals of the inverters.

In an example implementation, the obtaining a phase $\theta$ of an alternating current voltage of the power grid includes: phase-locking the alternating current voltage of the power grid to obtain a phase waveform of the power grid voltage; and obtaining the phase of the alternating current voltage from the phase waveform. The phase-locking the alternating current voltage of the power grid to obtain a phase waveform of the power grid voltage includes at least the following two manners:

manner 1: phase-locking the power grid voltage by using a predetermined phase-lock algorithm, to obtain the phase waveform of the power grid voltage, where the predetermined phase-lock algorithm includes at least any one of the following: a single synchronous reference frame software phase-locked loop, a single synchronous reference frame software phase-locked loop with a method of symmetrical components, a decoupled double synchronous reference frame software phase-locked loop, and a software phase-locked loop based on a double second-order generalized integrator; and manner 2: obtaining any phase of voltage of the alternating current voltage of the power grid; detecting a voltage zero crossing point and a voltage frequency of the phase of voltage, and obtaining, based on the voltage zero crossing point and the voltage frequency, a first waveform corresponding to the voltage zero crossing point, and a second waveform corresponding to a positive voltage cycle and a negative voltage cycle that are on two sides of the voltage zero crossing point; and obtaining the phase waveform of the alternating current voltage of the power grid based on the first waveform and the second waveform.

In an example implementation, the determining a time period $T_\theta$ during which the phase of the alternating current voltage varies within a preset phase threshold interval, when it is detected that the phase $\theta$ of the alternating current voltage has reached a phase threshold includes: triggering a counting when it is detected that the phase $\theta$ of the alternating current voltage has reached the phase threshold; obtaining a counting period quantity between the current triggered counting and a next triggered counting; and determining, based on the counting period quantity and a time length $\Delta t$ of one counting, the time period $T_\theta$ during which the phase of the alternating current voltage varies within the preset phase threshold interval.

In an example implementation, the generating the preset carrier wave $C_0(t)$ based on the period $T_c$ of the preset carrier wave includes: generating the preset carrier wave $C_0(t)$ based on the period $T_c$ of the theoretical (preset) carrier wave, an initial phase of the preset carrier wave, and an amplitude of the preset carrier wave.

In an example implementation, the generating a PWM control signal of the inverter based on a PWM modulation signal and the preset carrier wave $C_0(t)$ includes: replacing a current inverter carrier wave $C(t)$ with the preset carrier wave $C_0(t)$; and generating the PWM control signal of the inverter based on the PWM modulation signal and the new current inverter carrier wave C(t).

In an example implementation, the generating a PWM control signal of the inverter based on a PWM modulation signal and the preset carrier wave $C_0(t)$ includes: comparing the preset carrier wave $C_0(t)$ with a current inverter carrier wave C(t) to generate a carrier wave regulation value; updating the current inverter carrier wave C(t) based on the carrier wave regulation value; and generating the PWM control signal of the inverter based on the PWM modulation signal and the updated current inverter carrier wave C(t). The comparing the preset carrier wave $C_0(t)$ with a current inverter carrier wave C(t) to generate a carrier wave regulation value includes: comparing the preset carrier wave $C_0(t)$ with the current inverter carrier wave C(t) to generate a carrier wave difference; and performing, based on the carrier wave difference, one or more of the following at least one control: a proportional control, an integral control, and a differential control, to generate the carrier wave regulation value.

According to a second aspect, an inverter is provided, where a direct current voltage terminal of an inverter circuit of the inverter is connected to an external direct current power supply, an alternating current voltage terminal of the inverter circuit of the inverter is connected to an alternating current point of common coupling of a power grid, and the inverter includes:

a carrier wave synchronization module, configured to: obtain a phase θ of an alternating current voltage of the power grid; determine a time period $T_\theta$ during which the phase of the alternating current voltage varies within a preset phase threshold interval, when detecting that the phase θ of the alternating current voltage has reached a phase threshold, where the phase threshold is a start phase of the preset phase threshold interval; calculate a period $T_c$ of a preset carrier wave based on a preset carrier wave ratio and the time period $T_\theta$; and generate the preset carrier wave $C_0(t)$ based on the period $T_c$ of the preset carrier wave;

a modulation module, configured to generate a PWM control signal of the inverter based on a PWM modulation signal and the preset carrier wave that is generated by the carrier wave synchronization module; and the inverter circuit, configured to convert a direct current voltage of the external direct current power supply into the alternating current voltage of the power grid based on the PWM control signal generated by the modulation module.

In the foregoing solution, the phase θ of the power grid is taken for reference in a process of generating a PWM control signal of each inverter connected to the power grid. Therefore, it can be avoided that the PWM control signals of the inverters are out of synchronization because the inverters have different DSP crystal oscillators, to ensure synchronization of the PWM control signals of the inverters.

In an example implementation, the carrier wave synchronization module is specifically configured to: phase-lock the alternating current voltage of the power grid to obtain a phase waveform of the power grid voltage; and obtain the phase of the alternating current voltage from the phase waveform. That the carrier wave synchronization module phase-locks the alternating current voltage of the power grid to obtain a phase waveform of the power grid voltage includes at least the following two manners:

manner 1: the carrier wave synchronization module is specifically configured to: phase-lock the power grid voltage by using a predetermined phase-lock algorithm, to obtain the phase waveform of the power grid voltage, where the predetermined phase-lock algorithm includes at least any one of the following: a single synchronous reference frame software phase-locked loop, a single synchronous reference frame software phase-locked loop with a method of symmetrical components, a decoupled double synchronous reference frame software phase-locked loop, and a software phase-locked loop based on a double second-order generalized integrator; and manner 2: the carrier wave synchronization module is specifically configured to: obtain any phase of voltage of the alternating current voltage of the power grid; detect a voltage zero crossing point and a voltage frequency of the phase of voltage, and obtain, based on the voltage zero crossing point and the voltage frequency, a first waveform corresponding to the voltage zero crossing point, and a second waveform corresponding to a positive voltage cycle and a negative voltage cycle that are on two sides of the voltage zero crossing point; and obtain the phase waveform of the alternating current voltage of the power grid based on the first waveform and the second waveform.

In an example implementation, the carrier wave synchronization module is specifically configured to: trigger a counting when detecting that the phase θ of the alternating current voltage has reached the phase threshold; obtain a counting period quantity $N_{ct}$ (a quantity of Δt-s) between the current triggered counting and a next triggered counting; and determine, based on the counting period quantity $N_{ct}$ and a time length Δt of one counting, the time period $T_\theta$ during which the phase of the alternating current voltage varies within the preset phase threshold interval.

In an example implementation, the carrier wave synchronization module is specifically configured to generate the preset carrier wave $C_0(t)$ based on the period $T_c$ of the theoretical carrier wave, an initial phase of the preset carrier wave, and an amplitude of the preset carrier wave.

In an example implementation, the modulation module includes: a loading control submodule, configured to replace a current inverter carrier wave C(t) with the preset carrier wave $C_0(t)$; and a modulation submodule, configured to generate the PWM control signal of the inverter based on the PWM modulation signal and the new current inverter carrier wave C(t) that is obtained by the loading control submodule.

In an example implementation, the modulation module includes: a loading control submodule, configured to: compare the preset carrier wave $C_0(t)$ with a current inverter carrier wave C(t) to generate a carrier wave regulation value; and update the current inverter carrier wave C(t) based on the carrier wave regulation value; and a modulation submodule, configured to: generate the PWM control signal of the inverter based on the PWM modulation signal and the current inverter carrier wave C(t) that is updated by the loading control submodule, where the loading control submodule is specifically configured to: compare the preset carrier wave $C_0(t)$ with the current inverter carrier wave C(t) to generate a carrier wave difference; and perform, on the carrier wave difference, one or more of the following at least one control: a proportional control, an integral control, and a differential control, to generate the carrier wave regulation value.

According to a third aspect, a power grid system is provided, including at least two groups of inverters, where direct current voltage terminals of the inverters are connected to an external direct current power supply, and alternating current voltage terminals of the inverters are connected to an alternating current point of common coupling of a power grid; and the inverters each are any inverter described in the second aspect or any example implementation of the second aspect.

It may be understood that any inverter or power grid system provided above can be used to perform the method, provided above, for synchronizing PWM control signals of inverters in the first aspect. Therefore, for beneficial effects that can be achieved by the inverter or the power grid system, refer to the beneficial effects of the method for synchronizing PWM control signals of inverters and solutions corresponding to the following specific embodiments. Details are not described herein.

BRIEF DESCRIPTION OF DRAWINGS

To describe the technical solutions in the embodiments of this application more clearly, the following briefly describes the accompanying drawings required for describing the embodiments or the prior art.

DESCRIPTION OF EMBODIMENTS

The following describes the embodiments of this application with reference to the accompanying drawings.

First, an application scenario of the embodiments of the present invention is described as below.

The embodiments of the present invention are applied to a power grid system of direct current-alternating current conversion in the field of electric power technologies. The system may include at least two groups of inverters, where direct current voltage terminals of the inverters are connected to an external direct current power supply, and alternating current voltage terminals of the inverters are connected to an alternating current point of common coupling of a power grid. A typical external direct current power supply may be a main apparatus of photovoltaic power generation, a main apparatus of wind power generation, a main apparatus of hydraulic power generation, an energy storage direct current battery, or a direct current power generating apparatus or an energy storage apparatus in other scenarios. A form of the external direct current power supply is not limited in this application.

Figure 1:
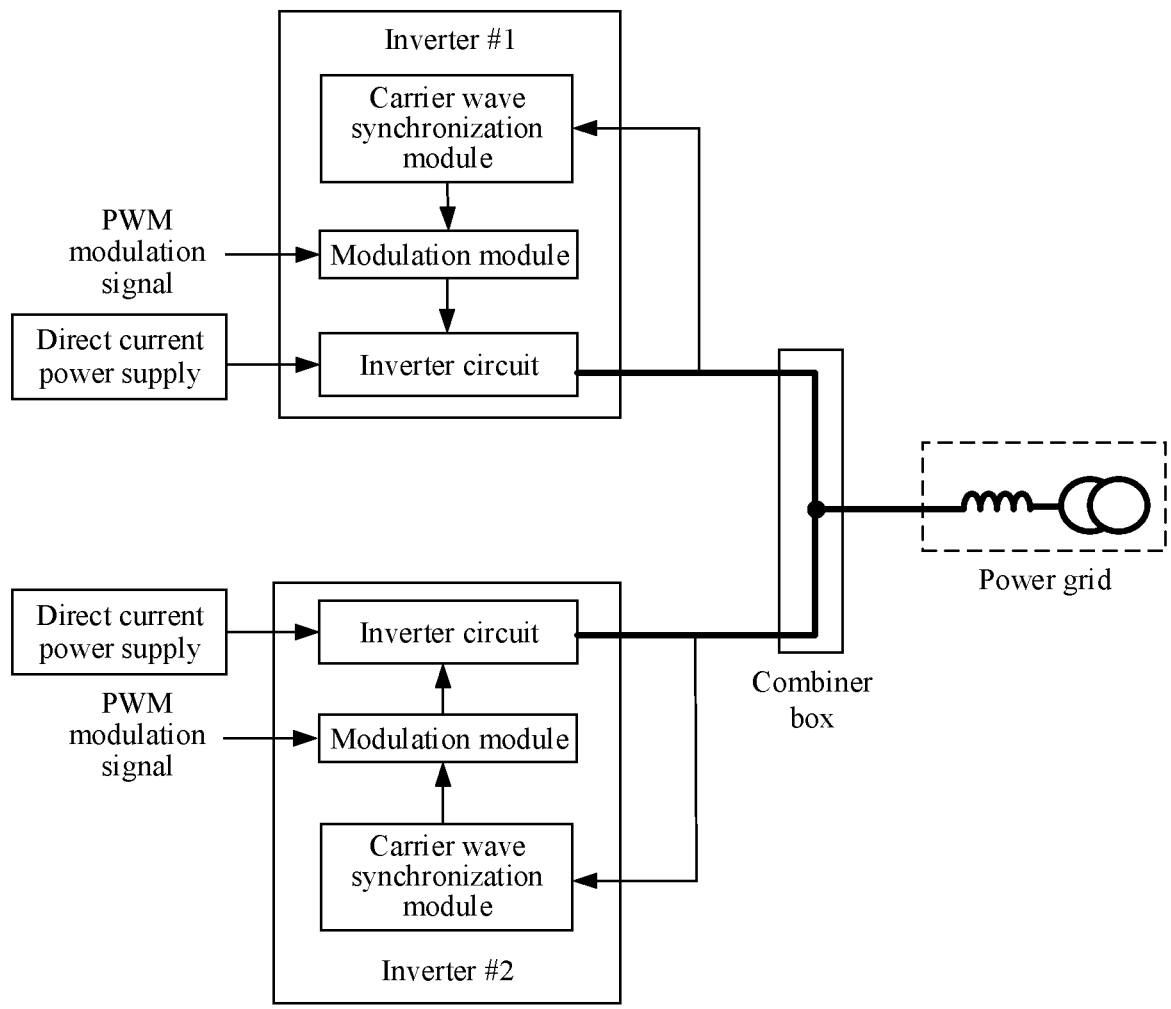
FIG. 1 is a schematic structural diagram of a power grid system according to an embodiment of the present invention.

A scenario in which two inverters are connected in parallel is used as an example. Referring to FIG. 1, an embodiment of the present invention provides a power grid system, including: an external direct current power supply, inverters, and a power grid. An inverter #1 and an inverter #2 may be independent inverters having no common direct current bus, that is, each of the inverter #1 and the inverter #2 is connected to an independent external direct current power supply. Alternatively, an inverter #1 and an inverter #2 may be inverters having a common direct current bus, that is, the inverter #1 and the inverter #2 are connected to one external direct current power supply by using one direct current bus (not shown in the figure).

A working principle of the power grid system is as follows: The inverter boosts and inverts electrical energy of the external direct current power supply, and then transmits the energy to the power grid. The inverter provides a PWM control signal whose phase is constant relative to the alternating current power grid for an inverter circuit based on a phase of an alternating current voltage of the power grid. In the prior art, phases of PWM control signals of two inverters are out of synchronization, and possibly time-varying and indefinite. Phases of PWM control signals generated in this embodiment of this application can be kept away from impact of a time-varying effect to reach a stable state, so that the phases of the PWM control signals of the two inverters tend to be identical.

Figure 2:
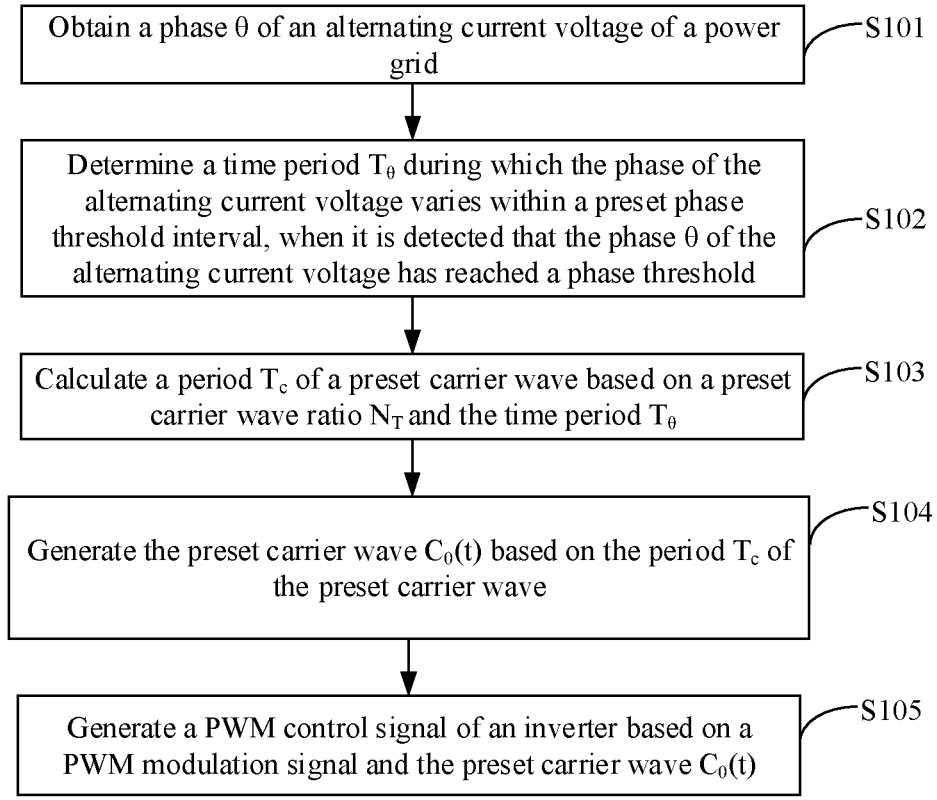
FIG. 2 is a schematic flowchart of a method for synchronizing PWM control signals of inverters according to an embodiment of the present invention.

Based on the foregoing power grid system, referring to FIG. 2, a method for synchronizing PWM control signals of inverters specifically includes the following steps.

S101: Obtain a phase θ of an alternating current voltage of the power grid.

As shown in FIG. 1, the power grid usually includes a transmission line, an isolation transformer, and the like. In some application scenarios, the power grid may further include a combiner box. As shown in FIG. 1, an inverter #1 and an inverter #2 are connected to the power grid usually by using the combiner box. The isolation transformer is generally a step-up box transformer, and includes a primary side winding, a secondary side winding, and a magnetic core. In step S101, the phase θ of the alternating current voltage of the power grid is generally obtained from the primary side winding side of the isolation transformer, that is, obtained at a low-voltage side. A length of an effective interval of the phase θ of the alternating current voltage is 2π, and an actual output phase θ is any value in [−π, π) or [0, 2π).

Step S101 may be specifically: phase-locking the alternating current voltage of the power grid to obtain a phase waveform of the power grid voltage; and obtaining the phase of the alternating current voltage from the phase waveform. A principle thereof is as follows: A frequency and a phase of the power grid voltage may be tracked and obtained by using a phase-locked loop, to obtain the phase waveform of the power grid voltage, where the phase waveform is usually a triangular wave of 0 degrees to 360 degrees. The phase-locked loop may be a software phase-locked loop or a hardware phase-locked loop; or a three-phase locked loop or a single-phase locked loop based on a phase quantity; or an opened phase-locked loop or a closed phase-locked loop based on a control structure.

The phase-locking the alternating current voltage of the power grid to obtain a phase waveform of the power grid voltage includes at least the following two manners.

Manner 1: A software phase-locked loop manner is used for implementation, and is specifically: phase-locking the power grid voltage by using a predetermined phase-lock algorithm, to obtain the phase waveform of the power grid voltage, where the predetermined phase-lock algorithm includes at least any one of the following: a single synchronous reference frame software phase-locked loop, a single synchronous reference frame software phase-locked loop with a method of symmetrical components, a decoupled double synchronous reference frame software phase-locked loop, and a software phase-locked loop based on a double second-order generalized integrator.

Figure 3:
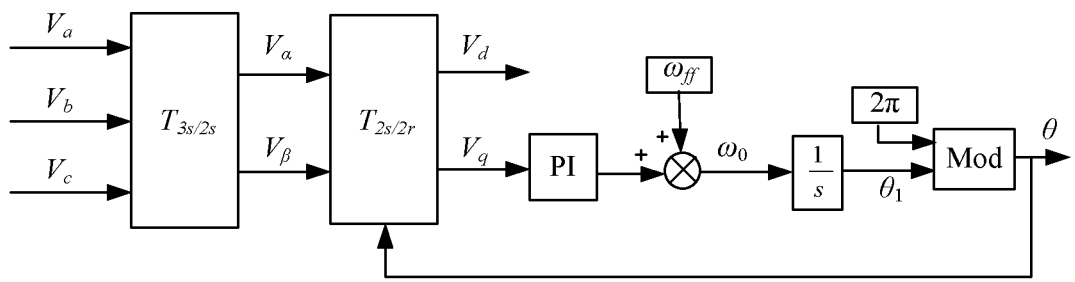
FIG. 3 is a schematic diagram of an implementation of a phase-locked loop according to an embodiment of the present invention.

Referring to FIG. 3, an implementation of a three-phase software phase-locked loop is provided.

First, a $T_{3s/2s}$ module converts voltages ($V_a$, $V_b$, $V_c$) of the three-phase power grid into voltages ($V_\alpha$, $V_\beta$) in a two-phase stationary reference frame. In this process, a Clarke (Clarke) transformation may be used, and a calculation formula is:

$$\begin{bmatrix} V_\alpha \\ V_\beta \end{bmatrix} = \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} V_a \\ V_b \\ V_c \end{bmatrix}.$$

A $T_{2s/2r}$ module converts the voltages ($V_\alpha$, $V_\beta$) in the two-phase stationary reference frame into voltages ($V_d$, $V_q$) in a synchronous rotating reference frame. In this process, a Park (Park) transformation may be used, and a calculation formula is:

$$\begin{bmatrix} V_d \\ V_q \end{bmatrix} = \begin{bmatrix} \cos(\theta) & \sin(\theta) \\ -\sin(\theta) & \cos(\theta) \end{bmatrix} \cdot \begin{bmatrix} V_\alpha \\ V_\beta \end{bmatrix}.$$

Herein, $\theta$ is a phase output from the phase-locked loop, and sinusoidal quantities in the three-phase (abc) stationary reference frame can be transformed into direct current quantities in the two-phase (dq) synchronous rotating reference frame through the foregoing two transformations.

The calculated $V_q$ is input to a PI controller (Proportional Integral Controller), and an output of the PI controller and a rated angular frequency $\omega_{ff}$ are added to obtain an actual angular frequency $\omega_0$. According to a working principle of the PI controller, the output of the PI controller remains constant only when $V_q$ is equal to 0. In this case, the entire phase-locked loop stops controlling, and an output phase is the same as a phase of the three-phase voltage.

Figure 4:
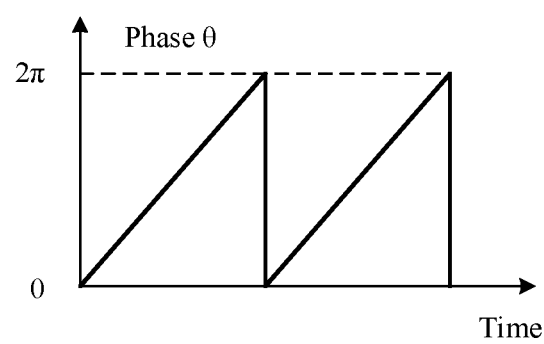
FIG. 4 is a schematic diagram of an output waveform of a phase-locked loop according to an embodiment of the present invention.

After the actual angular frequency $\omega_0$ is obtained, an integral module 1/s performs an integral operation on $\omega_0$ to obtain an initial phase $\theta_1$, and a modulo module Mod performs a modulo operation on $\theta_1$ to obtain a remainder of dividing $\theta_1$ by $2\pi$. The remainder is the output phase $\theta$. A value of $\theta$ can be limited between 0 and $2\pi$ through the modulo operation, to avoid overflow. Finally, a schematic diagram of an output phase waveform is shown in FIG. 4.

Manner 2: A hardware phase-locked loop manner is used for implementation, and specifically includes: obtaining any phase of voltage of the alternating current voltage of the power grid; detecting a voltage zero crossing point and a voltage frequency of the phase of voltage, and obtaining, based on the voltage zero crossing point and the voltage frequency, a first waveform corresponding to the voltage zero crossing point, and a second waveform corresponding to a positive voltage cycle and a negative voltage cycle that are on two sides of the voltage zero crossing point; and obtaining the phase waveform of the alternating current voltage of the power grid based on the first waveform and the second waveform.

Figure 5:
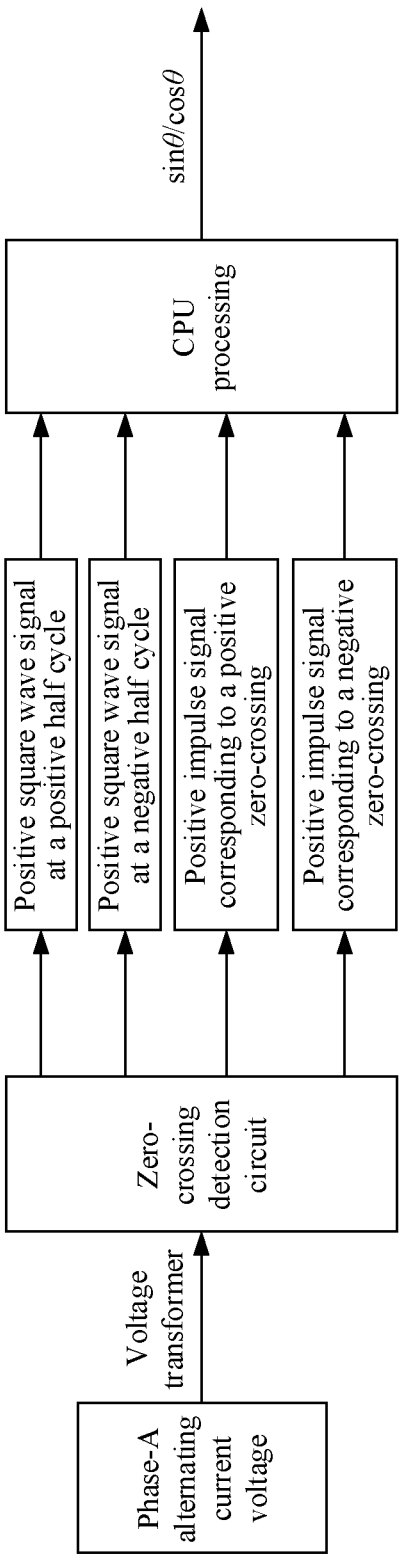
FIG. 5 is a schematic diagram of an implementation of a phase-locked loop according to another embodiment of the present invention.

As shown in FIG. 5, a schematic structural diagram of a hardware phase-locked loop is provided.

A phase-A alternating current voltage of the power grid is used as an example. After the phase-A alternating current voltage is processed by a voltage transformer, a zero crossing point and a voltage frequency of the phase-A alternating current voltage are detected in real time by using a zero crossing point detection circuit. A first waveform corresponding to the voltage zero crossing point is obtained based on the voltage zero crossing point and the voltage frequency, where the first waveform includes a positive impulse signal corresponding to a positive zero crossing point, and a positive impulse signal corresponding to a negative zero crossing point. In addition, a second waveform corresponding to a positive voltage cycle and a negative voltage cycle that are on two sides of the voltage zero crossing point is obtained, where the second waveform includes a square wave signal at a positive half cycle, and a square wave signal at a negative half cycle. Then, the first waveform and the second waveform are provided for a backend CPU as synchronization reference signals of the alternating current voltage of the power grid, and the backend CPU tracks frequency variations of the alternating current voltage of the power grid based on the first waveform and the second waveform to obtain a phase waveform $\sin\theta/\cos\theta$ of the alternating current voltage of the power grid. The backend CPU may be a digital processing chip, or a logic programmable chip.

S102: Determine a time period $T_\theta$ during which the phase of the alternating current voltage varies within a preset phase threshold interval, when it is detected that the phase $\theta$ of the alternating current voltage has reached a phase threshold.

The phase threshold $\theta$ is a start phase of the preset phase threshold interval. For example, N constant phases are chosen from an effective alternating current phase interval with a length of $2\pi$, and the N constant phases are used as preset phase thresholds, where N is a natural number greater than or equal to 1. The effective alternating current phase interval with the length of $2\pi$ is equally divided by the N phase thresholds, and a phase spacing between two adjacent preset phase thresholds is $\Delta\theta=2\pi/N$.

Figure 6:
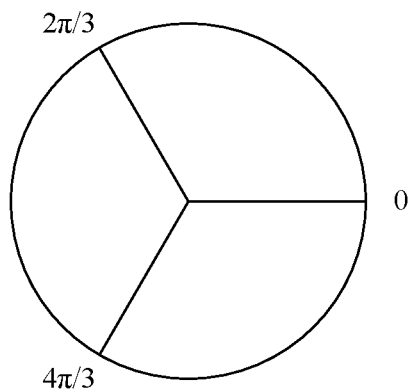
FIG. 6 is a schematic diagram of a phase threshold according to an embodiment of the present invention.

For example, if three phase thresholds are set, the three phase thresholds may be respectively 0, $2\pi/3$, and $4\pi/3$ with a phase spacing of $2\pi/3$ between every two adjacent phase thresholds. As shown in FIG. 6, a circle is divided into three equal parts, and trisection points are used as the phase thresholds.

Figure 7:
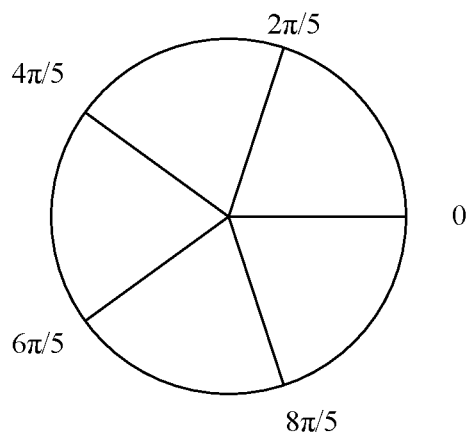
FIG. 7 is a schematic diagram of a phase threshold according to another embodiment of the present invention.

For another example, if five phase thresholds are set, the five phase thresholds may be respectively 0, $2\pi/5$, $4\pi/5$, $6\pi/5$, and $8\pi/5$ with a phase spacing of $2\pi/5$ between every two adjacent phase thresholds. Specifically, as shown in FIG. 7, a circle is divided into five equal parts, and quinquesection points are used as the phase thresholds.

Step S102 is specifically as follows.

S1: Trigger a counting when it is detected that the phase $\theta$ of the alternating current voltage has reached the phase threshold.

S2: Obtain a counting period quantity $N_{ct}$ (a quantity of $\Delta t$-s) between the current triggered counting and a next triggered counting.

S3: Determine, based on the counting period quantity $N_{ct}$ and a time length $\Delta t$ of one counting, the time period $T_\theta$ during which the phase of the alternating current voltage varies within the preset phase threshold interval.

Figure 8:
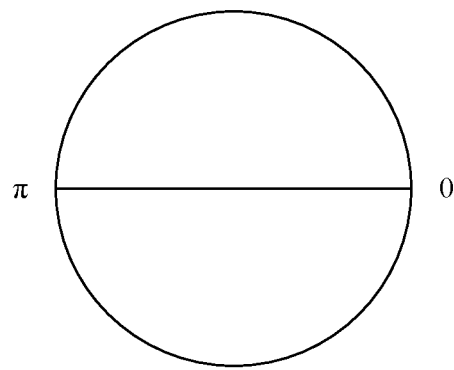
FIG. 8 is a schematic diagram of a phase threshold according to still another embodiment of the present invention.
Figure 9:
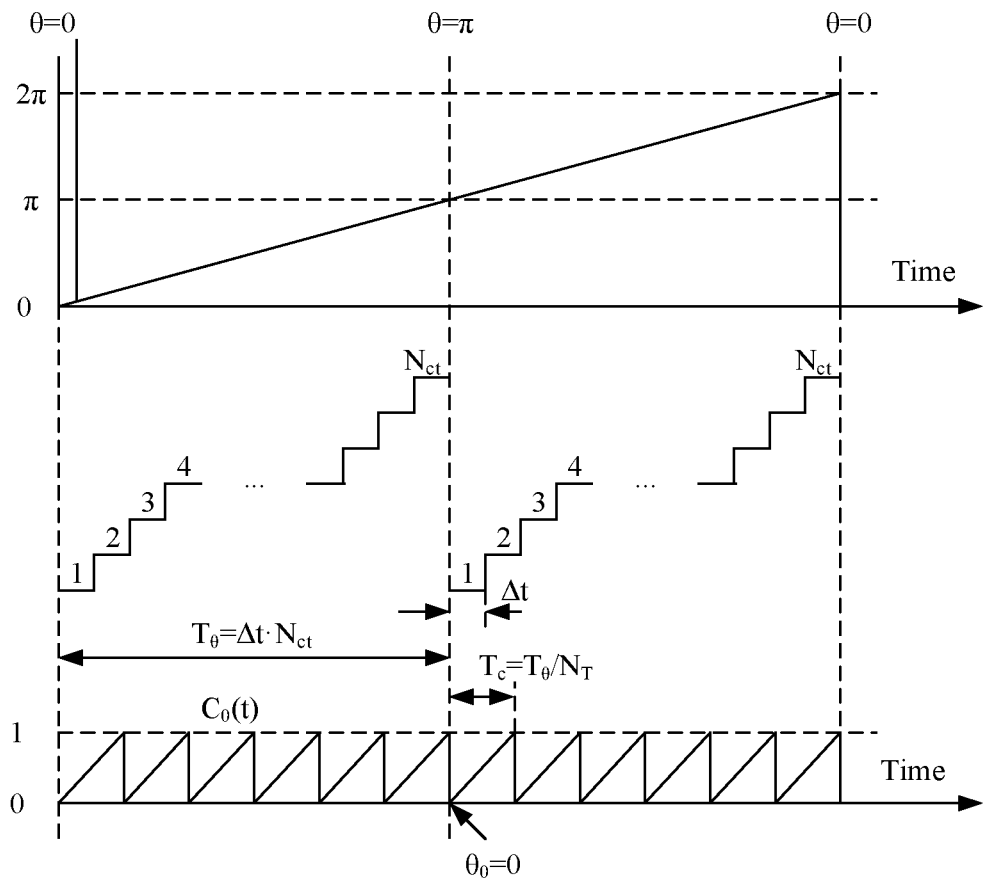
FIG. 9 is a schematic diagram of a method for generating a preset carrier wave $C_0(t)$ according to an embodiment of the present invention.

For example, the time length $T_\theta$ during which the phase of the alternating current voltage varies within the preset phase threshold interval is a time length for the phase $\theta$ of the alternating current voltage to go from a previous preset phase threshold to a current phase threshold. A specific obtaining manner is: when the phase $\theta$ of the alternating current voltage is equal to the previous phase threshold, triggering a counter to count from 1 (the counting period quantity $N_{ct}=1$); and when the phase $\theta$ of the alternating current voltage is equal to the current phase threshold, reading the counting period quantity $N_{ct}$ of the counter, and setting the counter to 1 to start a next round of counting, where $T_\theta$ is equal to the current counting period quantity $N_{ct}$ multiplied by the time length $\Delta t$ of one counting. Examples of going from the previous phase threshold to the current phase threshold are from 0 to $2\pi/5$, from $2\pi/5$ to $4\pi/5$, from $4\pi/5$ to $6\pi/5$, and so on. For example, as shown in FIG. 8 and FIG. 9, two constant phases are chosen from an effective alternating current voltage phase interval with a length of $2\pi$, as phase thresholds, which are respectively 0 and $\pi$. Then, two preset phase threshold intervals are [0, $\pi$) and [$\pi$, $2\pi$). In this case, when the phase $\theta$, of the alternating current voltage, output in step S101 is equal to 0 or $\pi$, a counting is triggered; and when 0 is $\pi$ or 0, the count value $N_{ct}$ of the counter is read, and the counter is set to 1 to start a next round of counting. A time length from a last time when the counter is set to 1 to the current time when the counter is set to 1 is obtained based on $T_\theta=\Delta t \cdot N_{ct}$, where the time length is correspondingly the time length $T_\theta$ during which the phase $\theta$ of the alternating current voltage goes from the previous phase threshold to the current phase threshold, that is, the time period $T_\theta$ during which the phase of the alternating current voltage varies within the preset phase threshold interval.

S103: Calculate a period $T_c$ of a preset carrier wave based on a preset carrier wave ratio $N_T$ and the time period $T_\theta$.

Step S103 is specifically: dividing $T_\theta$ by the preset carrier wave ratio $N_T$ to obtain the period $T_c$ of the preset carrier wave, where the preset carrier wave ratio $N_T$ is usually set with reference to a frequency Fn of the power grid and a switching frequency Fsw of the inverter, and $N_T$=Fsw/Fn. When the frequency Fn of the power grid is constant, a greater preset carrier wave ratio $N_T$ indicates that a waveform output by the inverter is closer to a sinusoidal wave, and certainly, also requires a higher switching frequency Fsw of the inverter. Usually, in China, a frequency Fn of a power grid is 50 Hz, and when a switching frequency Fsw of a used inverter is greater than or equal to 10 kHz, $N_T$ is set to be greater than or equal to 200.

S104: Generate the preset carrier wave $C_0(t)$ based on the period $T_c$ of the preset carrier wave.

As shown in FIG. 9, after the period $T_c$ of the preset carrier wave is obtained, the preset carrier wave $C_0(t)$ is generated based on the period $T_c$ of the preset carrier wave, an initial phase $\theta o$ of the preset carrier wave $C_0(t)$, and an amplitude A of the preset carrier wave $C_0(t)$. For example, as shown in FIG. 9, the initial phase $\theta o$ of the preset carrier wave $C_0(t)$ is 0, the amplitude A of the preset carrier wave $C_0(t)$ is 1, and the preset carrier wave $C_0(t)$ is generated with a triangular waveform or a sawtooth waveform.

S105: Generate a PWM control signal of an inverter based on a PWM modulation signal and the preset carrier wave $C_0(t)$, so that an inverter circuit of the inverter converts a direct current voltage of the external direct current power supply into the alternating current voltage of the power grid based on the PWM control signal.

Step S105 may be implemented in a gradual replacement manner or a direct replacement manner as follows.

Manner 1: When direct replacement is used, the following steps are included:

a. Replace a current inverter carrier wave $C(t)$ with the preset carrier wave $C_0(t)$.

b. Generate the PWM control signal of the inverter based on the PWM modulation signal and the new current inverter carrier wave $C(t)$.

Figure 10:
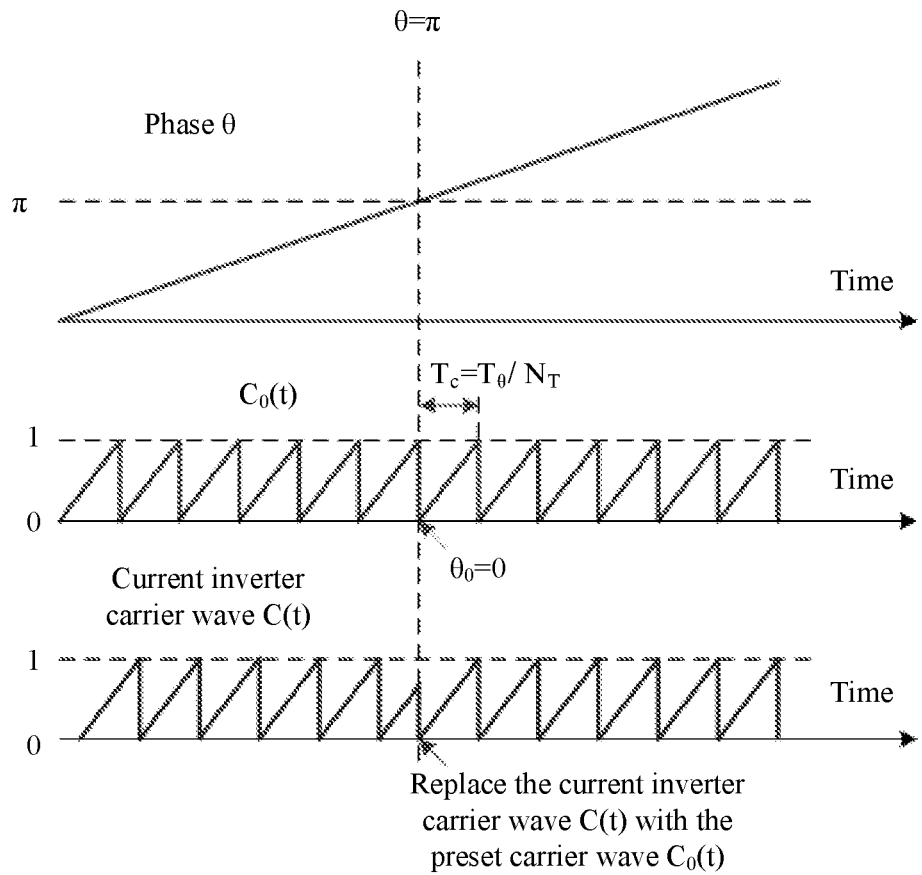
FIG. 10 is a schematic diagram of a method for generating an inverter carrier wave $C(t)$ according to an embodiment of the present invention.

As shown in FIG. 10, after the preset carrier wave $C_0(t)$ is obtained, and when the phase $\theta$ of the alternating current voltage is equal to the preset phase threshold $\pi$, the current inverter carrier wave $C(t)$ is replaced with the preset carrier wave $C_0(t)$, and the original carrier wave $C(t)$ of the inverter remains unchanged before replacement.

Manner 2: When gradual replacement is used, the following steps are included:

a. Compare the preset carrier wave $C_0(t)$ with a current inverter carrier wave $C(t)$ to generate a carrier wave regulation value.

b. Update the current inverter carrier wave $C(t)$ based on the carrier wave regulation value.

c. Generate the PWM control signal of the inverter based on the PWM modulation signal and the updated current inverter carrier wave $C(t)$.

Figure 11:
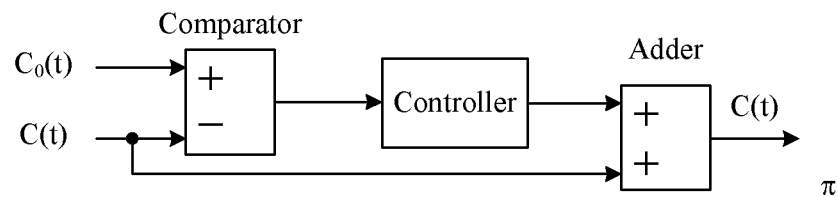
FIG. 11 is a schematic diagram of a method for generating an inverter carrier wave $C(t)$ according to another embodiment of the present invention.

As shown in FIG. 11, step a in the foregoing manner 2 may be implemented by using a comparator and a controller, and step b may be implemented by using an adder. Specifically, the preset carrier wave $C_0(t)$ and the current inverter carrier wave $C(t)$ are input to the comparator to calculate a carrier wave difference. The carrier wave difference is input to the controller to perform, based on the carrier wave difference, one or more of the following at least one control: a proportional control, an integral control, and a differential control, to generate the carrier wave regulation value. The carrier wave regulation value and the current inverter carrier wave $C(t)$ are added to update the current inverter carrier wave $C(t)$.

The foregoing steps S101 to S105 may be implemented by embedding a segment of software program into a DSP without changing hardware facilities of the current inverter.

Figure 12:
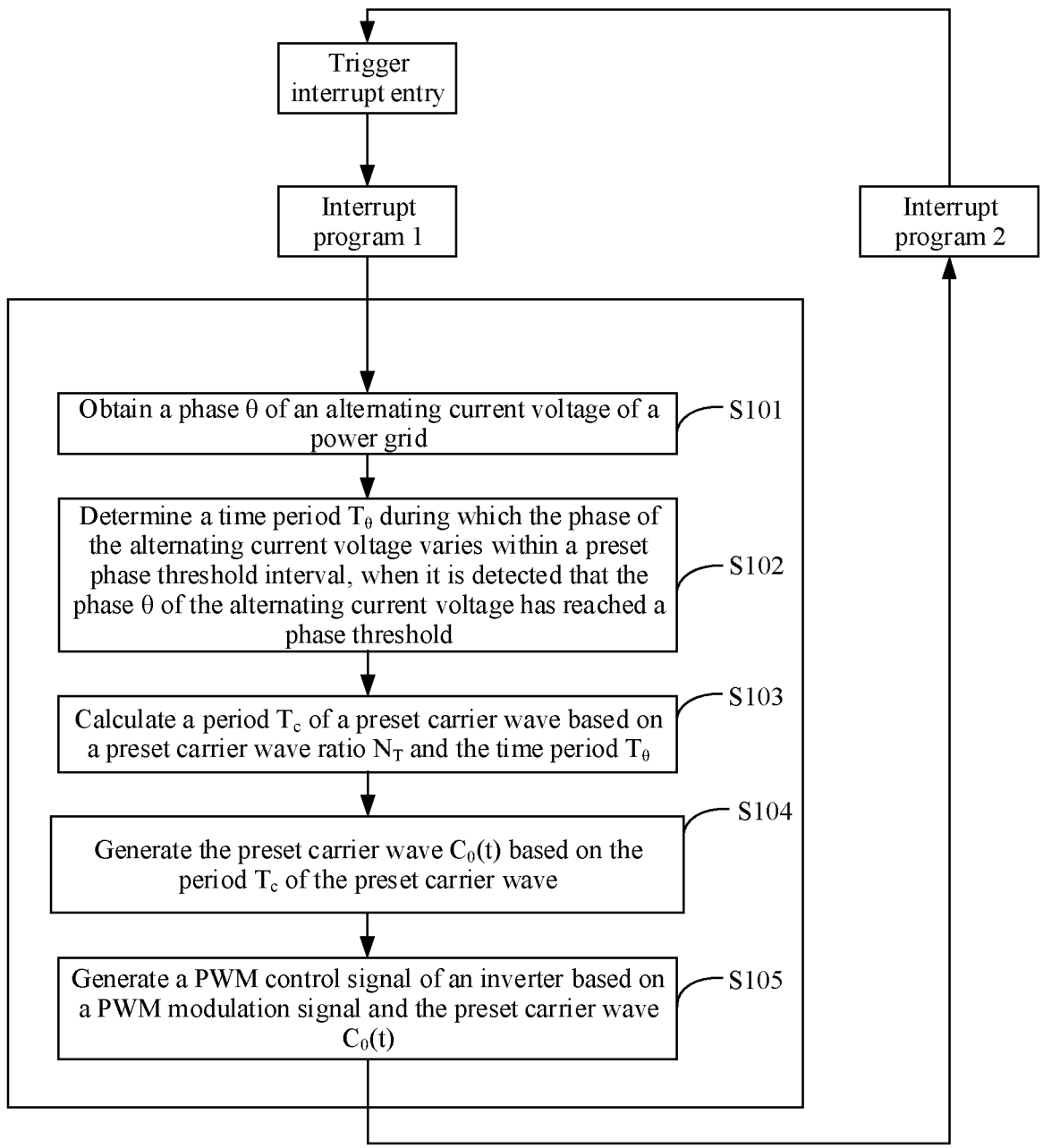
FIG. 12 is a schematic flowchart of a method for synchronizing PWM control signals of inverters according to another embodiment of the present invention.

Specifically, as shown in FIG. 12, the foregoing steps S101 to S105 may be implemented in DSP interrupt resources. Interrupt is a process that is executed cyclically at a constant frequency. Each interrupt needs to be triggered internally or externally, and after all interrupt programs are executed, the interrupt is exited until a next interrupt is triggered. After an interrupt program is entered, first, an interrupt program 1 is executed, then steps S101 to S105 are performed, and then an interrupt program 2 is executed. Then, all interrupt programs are executed. Then, when a next interrupt is triggered, the interrupt is entered again to execute all the interrupt programs all over again. The interrupt program 1 is a segment of program from when the interrupt is entered to when steps S101 to S105 are started. The interrupt program 2 is a segment of program from when steps S101 to S105 end to when the interrupt ends. A part between the interrupt program 1 and the interrupt program 2 is steps S101 to S105.

In the foregoing solution, the phase θ of the power grid is taken for reference in a process of generating a PWM control signal of each inverter connected to the power grid. Therefore, it can be avoided that the PWM control signals of the inverters are out of synchronization because the inverters have different DSP crystal oscillators, to ensure synchronization of the PWM control signals of the inverters.

Figure 13:
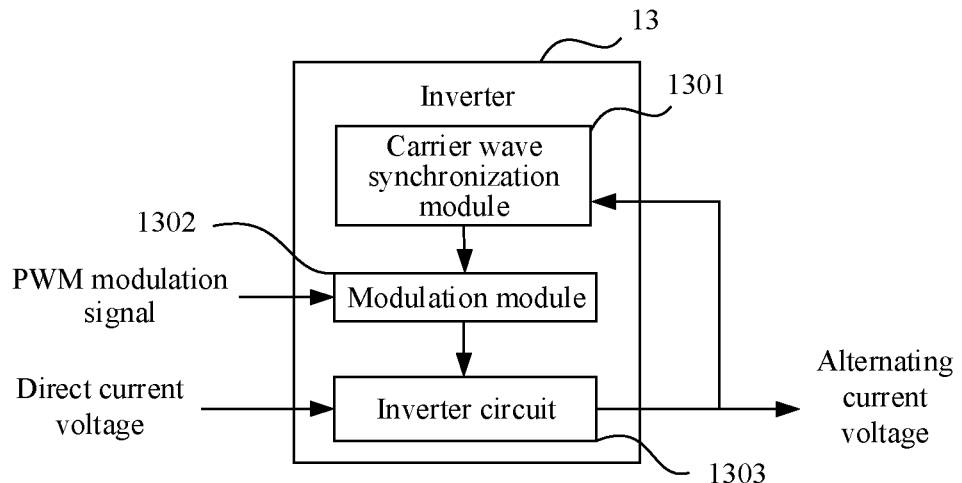
FIG. 13 is a schematic structural diagram of an inverter according to an embodiment of the present invention.
Figure 14:
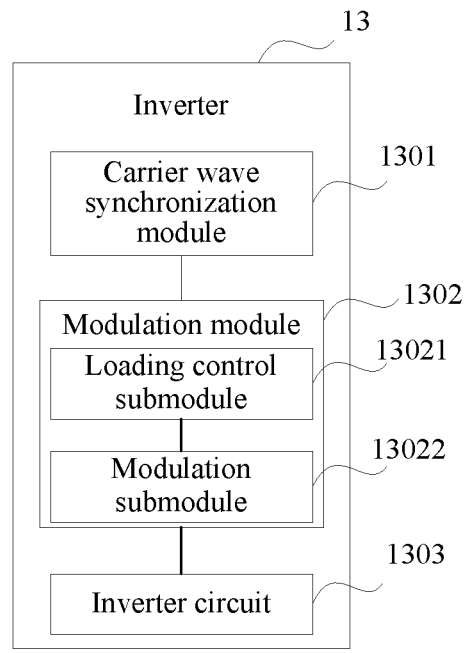
FIG. 14 is a schematic structural diagram of an inverter according to another embodiment of the present invention.

An embodiment of this application provides an inverter. As shown in FIG. 1, a direct current voltage terminal of an inverter circuit of the inverter is connected to an external direct current power supply, and an alternating current voltage terminal of the inverter circuit of the inverter is connected to an alternating current point of common coupling of a power grid. The inverter is configured to perform the foregoing method for synchronizing PWM control signals of inverters. As shown in FIG. 1 and FIG. 13, an inverter 13 includes a carrier wave synchronization module 1301, a modulation module 1302, and an inverter circuit 1303. The carrier wave synchronization module 1301 is configured to support the inverter in performing processes S101 to S104 in FIG. 2, the modulation module 1302 is configured for the inverter to perform a process S105 in FIG. 2, and the inverter circuit 1303 is configured to convert a direct current voltage of the external direct current power supply into an alternating current voltage of the power grid based on a PWM control signal. In addition, as shown in FIG. 14, the modulation module 1302 specifically includes: a loading control submodule 13021, configured to replace a current inverter carrier wave C(t) with a preset carrier wave $C_0(t)$; and a modulation submodule 13022, configured to generate the PWM control signal of the inverter based on a PWM modulation signal and the new current inverter carrier wave C(t) that is obtained by the loading control submodule 13021. Alternatively, the modulation module 1302 specifically includes: a loading control submodule 13021, configured to compare the preset carrier wave $C_0(t)$ with a current inverter carrier wave C(t) to generate a carrier wave regulation value, and update the current inverter carrier wave C(t) based on the carrier wave regulation value; and a modulation submodule 13022, configured to generate the PWM control signal of the inverter based on a PWM modulation signal and the current inverter carrier wave C(t) that is updated by the loading control submodule 13021. The loading control submodule 13021 is specifically configured to: compare the preset carrier wave $C_0(t)$ with the current inverter carrier wave C(t) to generate a carrier wave difference; and perform, based on the carrier wave difference, one or more of the following at least one control: a proportional control, an integral control, and a differential control, to generate the carrier wave regulation value. All related content of the steps in the foregoing method embodiment can be incorporated into descriptions of functions of corresponding functional modules by reference. Details are not described herein again.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, devices, or units, and may be implemented in an electrical form, a mechanical form, or another form.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for synchronizing pulse width modulation ("PWM") control signals of inverters, wherein a direct current voltage terminal of an inverter circuit of an inverter is connected to an external direct current power supply, an alternating current voltage terminal of the inverter circuit of the inverter is connected to an alternating current point of common coupling of a power grid, and the method comprises:
   obtaining a phase of an alternating current voltage of the power grid;
   determining a time during which the phase of the alternating current voltage is within a preset phase threshold interval, based at least on when it is detected that the phase of the alternating current voltage has reached a phase threshold, wherein the phase threshold is a start phase of the preset phase threshold interval;
   calculating a period of a preset carrier wave based on a preset carrier wave ratio and the determined time;
   generating the preset carrier wave based on the period of the preset carrier wave; and
   generating a PWM control signal of the inverter based on a PWM modulation signal and the preset carrier wave, so that the inverter circuit of the inverter converts a direct current voltage of the external direct current power supply into the alternating current voltage of the power grid based on the PWM control signal.

2. The method according to claim 1, wherein the obtaining the phase of the alternating current voltage of the power grid comprises:
   phase-locking the alternating current voltage of the power grid to obtain a phase waveform of the alternating current voltage of the power grid; and
   obtaining the phase of the alternating current voltage from the phase waveform.

3. The method according to claim 2, wherein the phase-locking the alternating current voltage of the power grid to obtain the phase waveform of the alternating current voltage of the power grid voltage comprises:
   phase-locking the power grid voltage by using a predetermined phase-lock algorithm to obtain the phase waveform of the power grid voltage, wherein the predetermined phase-lock algorithm comprises at least any one of: a single synchronous reference frame software phase-locked loop, a single synchronous reference frame software phase-locked loop with a method of symmetrical components, a decoupled double synchronous reference frame software phase-locked loop, or a software phase-locked loop based on a double second-order generalized integrator.

4. The method according to claim 2, wherein the phase-locking the alternating current voltage of the alternating current voltage of the power grid to obtain the phase waveform of the power grid voltage comprises:
obtaining any phase of voltage of the alternating current voltage of the power grid;
detecting a voltage zero crossing point and a voltage frequency of the phase of voltage, and obtaining, based on the voltage zero crossing point and the voltage frequency, a first waveform corresponding to the voltage zero crossing point, and a second waveform corresponding to a positive voltage cycle and a negative voltage cycle that are on two sides of the voltage zero crossing point; and
obtaining the phase waveform of the alternating current voltage of the power grid based on the first waveform and the second waveform.

5. The method according to claim 1, wherein the determining the time during which the phase of the alternating current voltage is within the preset phase threshold interval, based at least on when it is detected that the phase of the alternating current voltage has reached the phase threshold comprises:
triggering a counting when it is detected that the phase of the alternating current voltage has reached the phase threshold;
obtaining a number from the counting between the triggered counting and a next triggered counting at a next phase threshold; and
determining, based on the number from the counting and a time length of one count, the time during which the phase of the alternating current voltage is within the preset phase threshold interval.

6. The method according to claim 1, wherein the generating the preset carrier wave based on the period of the preset carrier wave comprises:
generating the preset carrier wave based on the period of the preset carrier wave, an initial phase of the preset carrier wave, and an amplitude of the preset carrier wave.

7. The method according to claim 1, wherein the generating the PWM control signal of the inverter based on the PWM modulation signal and the preset carrier wave comprises:
replacing a current inverter carrier wave with the preset carrier wave; and
generating the PWM control signal of the inverter based on the PWM modulation signal and the preset carrier wave.

8. The method according to claim 1, wherein the generating the PWM control signal of the inverter based on the PWM modulation signal and the preset carrier wave comprises:
comparing the preset carrier wave with a current inverter carrier wave to generate a carrier wave regulation value;
updating the current inverter carrier wave based on the carrier wave regulation value; and
generating the PWM control signal of the inverter based on the PWM modulation signal and the updated current inverter carrier wave.

9. The method according to claim 8, wherein the comparing the preset carrier wave with the current inverter carrier wave to generate the carrier wave regulation value comprises:
comparing the preset carrier wave with the current inverter carrier wave to generate a carrier wave difference; and
performing, based on the carrier wave difference, one or more of the following at least one control: a proportional control, an integral control, and a differential control, to generate the carrier wave regulation value.

10. An inverter, wherein a direct current voltage terminal of an inverter circuit of the inverter is connected to an external direct current power supply, an alternating current voltage terminal of the inverter circuit of the inverter is connected to an alternating current point of common coupling of a power grid, and the inverter comprises:
a carrier wave synchronization module, configured to: obtain a phase of an alternating current voltage of the power grid; determine a time during which the phase of the alternating current voltage is within a preset phase threshold interval, based at least on when it is detected that the phase of the alternating current voltage has reached a phase threshold, wherein the phase threshold is a start phase of the preset phase threshold interval; calculate a period of a preset carrier wave based on a preset carrier wave ratio and the determined time; and generate the preset carrier wave based on the period of the preset carrier wave;
a modulation module, configured to generate a pulse width modulation ("PWM") control signal of the inverter based on a PWM modulation signal and the preset carrier wave that is generated by the carrier wave synchronization module; and
the inverter circuit, configured to convert a direct current voltage of the external direct current power supply into the alternating current voltage of the power grid based on the PWM control signal generated by the modulation module.

11. The inverter according to claim 10, wherein the carrier wave synchronization module is specifically configured to: phase-lock the alternating current voltage of the power grid to obtain a phase waveform of the power grid voltage; and obtain the phase of the alternating current voltage from the phase waveform.

12. The inverter according to claim 11, wherein the carrier wave synchronization module is specifically configured to: phase-lock the power grid voltage by using a predetermined phase-lock algorithm, to obtain the phase waveform of the power grid voltage, wherein the predetermined phase-lock algorithm comprises at least any one of the following: a single synchronous reference frame software phase-locked loop, a single synchronous reference frame software phase-locked loop with a method of symmetrical components, a decoupled double synchronous reference frame software phase-locked loop, and a software phase-locked loop based on a double second-order generalized integrator.

13. The inverter according to claim 11, wherein the carrier wave synchronization module is specifically configured to: obtain any phase of voltage of the alternating current voltage of the power grid; detect a voltage zero crossing point and a voltage frequency of the phase of voltage, and obtain, based on the voltage zero crossing point and the voltage frequency, a first waveform corresponding to the voltage zero crossing point, and a second waveform corresponding to a positive voltage cycle and a negative voltage cycle that are on two sides of the voltage zero crossing point; and obtain the phase waveform of the alternating current voltage of the power grid based on the first waveform and the second waveform.

14. The inverter according to claim 10, wherein the carrier wave synchronization module is specifically configured to: trigger a counting when detecting that the phase of the alternating current voltage has reached the phase threshold; obtain a number from the counting between the triggered counting and a next triggered counting at a next phase threshold; and determine, based on the number from the counting and a time length of one count, the time during which the phase of the alternating current voltage is within the preset phase threshold interval.

15. The inverter according to claim 10, wherein the carrier wave synchronization module is specifically configured to generate the preset carrier wave based on the period of the preset carrier wave, an initial phase of the preset carrier wave, and an amplitude of the preset carrier wave.

16. The inverter according to claim 10, wherein the modulation module comprises: a loading control submodule, configured to replace a current inverter carrier wave with the preset carrier wave; and
 a modulation submodule, configured to generate the PWM control signal of the inverter based on the PWM modulation signal and the preset carrier wave that is used by the loading control submodule to replace the current inverter carrier wave.

17. The inverter according to claim 10, wherein the modulation module comprises: a loading control submodule, configured to: compare the preset carrier wave with a current inverter carrier wave to generate a carrier wave regulation value; and update the current inverter carrier wave based on the carrier wave regulation value; and
 a modulation submodule, configured to: generate the PWM control signal of the inverter based on the PWM modulation signal and the current inverter carrier wave that is updated by the loading control submodule.

18. The inverter according to claim 17, wherein the loading control submodule is specifically configured to: compare the preset carrier wave with the current inverter carrier wave to generate a carrier wave difference; and perform, based on the carrier wave difference, one or more of the following at least one control: a proportional control, an integral control, and a differential control, to generate the carrier wave regulation value.

19. A power grid system, comprising at least two groups of inverters, wherein direct current voltage terminals of the inverters are connected to an external direct current power supply, and alternating current voltage terminals of the inverters are connected to an alternating current point of common coupling of a power grid, wherein
 the inverter having a direct current voltage terminal of an inverter circuit being connected to an external direct current power supply, an alternating current voltage terminal of the inverter circuit being connected to an alternating current point of common coupling of a power grid, and the inverter comprising:
 a carrier wave synchronization module, configured to: obtain a phase of an alternating current voltage of the power grid; determine a time during which the phase of the alternating current voltage is within a preset phase threshold interval, based at least on when it is detected that the phase of the alternating current voltage has reached a phase threshold, wherein the phase threshold is a start phase of the preset phase threshold interval; calculate a period of a preset carrier wave based on a preset carrier wave ratio and the determined time; and generate the preset carrier wave based on the period of the preset carrier wave; and
 a modulation module, configured to generate a pulse width modulation ("PWM") control signal of the inverter based on a PWM modulation signal and the preset carrier wave that is generated by the carrier wave synchronization module;
 wherein the inverter circuit, configured to convert a direct current voltage of the external direct current power supply into the alternating current voltage of the power grid based on the PWM control signal generated by the modulation module.

20. The system according to claim 19, wherein the carrier wave synchronization module is specifically configured to: phase-lock the alternating current voltage of the power grid to obtain a phase waveform of the power grid voltage; and obtain the phase of the alternating current voltage from the phase waveform.

* * * * *

UNITED STATES PATENT AND TRADEMARK OFFICE
CERTIFICATE OF CORRECTION

PATENT NO. : 11,223,205 B2
APPLICATION NO. : 16/833969
DATED : January 11, 2022
INVENTOR(S) : Yuan et al.

Page 1 of 1

It is certified that error appears in the above-identified patent and that said Letters Patent is hereby corrected as shown below:

On the Title Page

Applicant (71): "HUAWEI TECHNOLOGIES CO., LTD., Guangdong (CN)" should read
-- HUAWEI TECHNOLOGIES CO., LTD., Shenzhen (CN) --.

Signed and Sealed this
Fifth Day of July, 2022

Katherine Kelly Vidal
*Director of the United States Patent and Trademark Office*